INVENTOR.
STANLEY S. THOMPSON

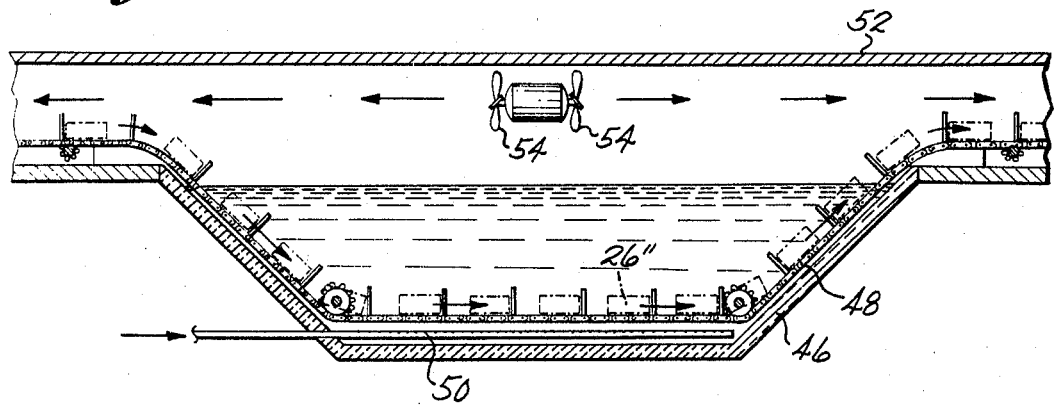
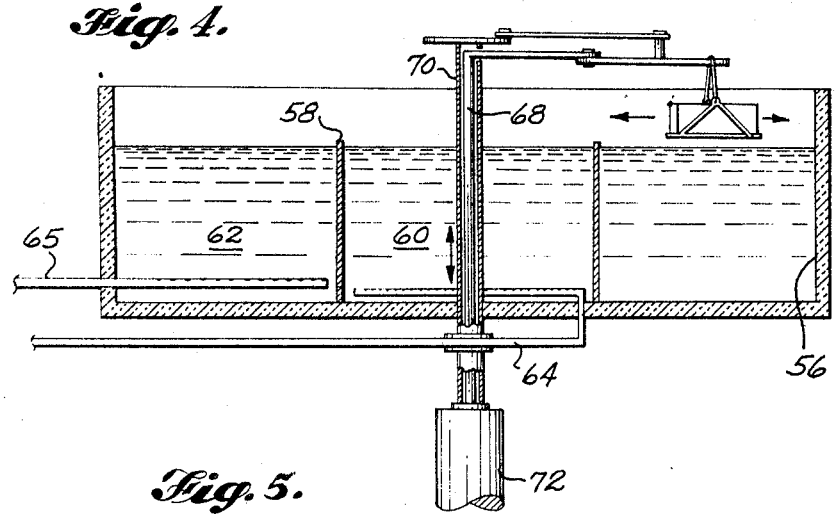
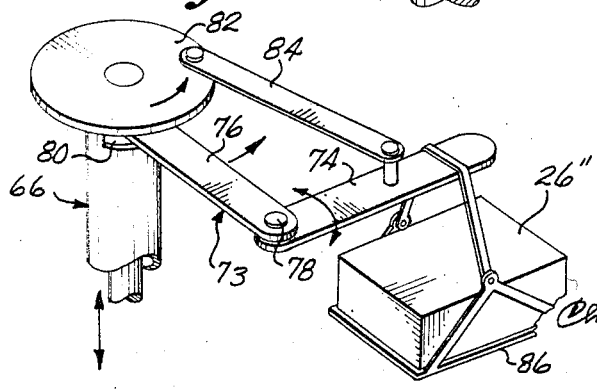

{# United States Patent Office 3,440,831
Patented Apr. 29, 1969

3,440,831
QUICK FREEZE PROCESS
Stanley S. Thompson, Seattle, Wash.
(Hoanah, Alaska 99829)
Filed Feb. 6, 1967, Ser. No. 629,838
Int. Cl. F25d 31/00, 13/06
U.S. Cl. 62—63                9 Claims

ABSTRACT OF THE DISCLOSURE

A process is disclosed whereby metal parts, food items, and other such liquid-immersible bodies are quick frozen to a given temperature by contacting liquid nitrogen at an expansion pressure, with a secondary refrigerant such as alcohol which is liquid at the aforesaid temperature, so as to lower the temperature of the secondary refrigerant to at least such temperature; and immersing the body or bodies in the liquid refrigerant while it is at the reduced temperature to quick freeze the bodies to the same. Certain additional features in the process relate to the preferred method of contacting the liquid nitrogen with the secondary refrigerant, the preferred sequence of steps, techniques for precooling and postcooling the bodies, and a multi-stage technique for carrying out the process at different operating temperatures.

FIELD OF THE INVENTION

This invention relates to the rapid cooling or quick freezing of liquid-immersible bodies such as food bodies, metal parts, rivets and the like; and in particular to a technique for quick freezing the body or bodies in a refrigerant system which includes liquid nitrogen. The invention is especially applicable to the preservation of food bodies, and accordingly will be described with particular reference to the same.

RELATED APPLICATIONS

None.

DISCUSSION OF THE PRIOR ART

The ideal food freezing process must have no effect on any of the inherent characteristics of the food. In addition, it must freeze the water of composition in the food at so rapid a rate that only small ice crystals form within the cellular structure of the food. When large crystals form as the result of slow freezing, they break down the cells and alter the frozen product to the extent that it bears no resemblance to the fresh product when thawed.

At present there are five general types of food freezing processes which are in commercial use. They are the cold-plate contact process, the high-velocity low-temperature air flow process, the various low-temperature brine processes, the powdered Dry Ice process and the cryogenic fluid dipping and spraying processes. Unfortunately, none of these processes approaches an ideal freezing process. The cold-plate contact process, the high-velocity low-temperature air flow process and the low-temperature brine processes have relatively slow freezing rates that impair the quality of the food and limit the production capability of the individual process. Fast freezing is possible with the cryogenic fluid dipping and spraying processes or the powdered Dry Ice freeze process. However, these so-called "cryogenic processes" are limited to the freezing of items under about three quarters inch in thickness— that is, to relatively thin items—since at greater thicknesses the quantities of cryogen and the sizes of apparatus which are needed become impracticable, if not virtually prohibitive in cost.

SUMMARY OF THE INVENTION

For these reasons, therefore, it is a principal object of the present invention to provide a fast freezing cryogenic technique which is especially suited to the quick freezing of relatively thick bodies such as fish, meat or poultry products. It is also an important object of the invention to provide a fast freezing technique of this nature which is subject to close temperature control in a liquid medium, so that each body must give up all of its heat energy before it is removed from the process. A still further object is to provide a technique of this nature which can quick freeze large and bulky items at rates comparable to those at which the aforementioned cryogenic techniques can freeze thin items. Other objects include the provision of a technique of this nature which can be carried out in a simple, inexpensive, highly automatic apparatus and at an efficiency which reduces refrigerant costs and wastage to a minimum. Still further objects will be apparent from the description of the invention which follows.

These objects and advantages are realized by a technique of my invention wherein a liquified gas such as liquid nitrogen is contacted at an expansion pressure, such as atmosphere pressure, with a secondary refrigerant which is liquid at the temperature to which the body or bodies are to be frozen, so as to lower the temperature of the refrigerant to at least such temperature; and the bodies are immersed in the secondary refrigerant while it is at this reduced temperature, to quick freeze the bodies to the same. The secondary refrigreant acts as a highly efficient heat transfer medium for the cooling capacity of the liquid nitrogen. In addition, if the liquid nitrogen is directly contacted with the secondary refrigerant, as by injecting it into the refrigerant at atmospheric pressure, the resulting agitation acts to break down the insulative film of liquid refrigerant which tends to form along the surfaces of the bodies. Preferably, the temperature of the secondary refrigerant is reduced to one well below the freezing point of the bodies, i.e. to one at or about −100° F. in the case of perishable foods; and the bodies are thereafter immersed in the secondary refrigerant, so that both the latent and sensible heat of the bodies are rapidly removed on contact with the refrigerant.

In some instances, however, it may be necessary or desirable to remove the heat from the bodies in stages, so as to not subject them to a sudden temperature change. In such a case, the bodies are immersed in one container of secondary refrigerant, and then rapidly transferred to a second container of refrigerant which has a lower operating temperature than the first. The two containers may contain the same refrigerant or different refrigerants. Also, one container may be used to insulate the other.

It may also be desirable to prolong the exposure of the bodies to the first stage. In such a case, or in any case where the retention period permits it, the bodies may be shifted about in the container of liquid to increase the degree of agitation.

The secondary refrigerant may be selected from a large group of organic and inorganic compounds. The main criterion for the refrigerant is that it exists as a liquid at the temperature to which the bodies are to be frozen, i.e. the freezing point of water in the case of perishable foods. Preferably, it should also have a high thermal capacity, a low viscosity, and good thermal conductivity. Suitable refrigerants include the alcohols, the silicone oils, and liquid Freon fluorocarbons such as Freon 12, 13, or 318.

The bodies may be protected by packaging, or they may be directly exposed to the refrigerant. In the latter case, the refrigerant must be approved for human consumption if the process is to be applied to foods. The refrigerant also must be either compatible with the perishables or tasteless. As is known, the ethanols and certain of the liquid Freon fluorocarbons meet these requirements.

Another feature of the invention makes use of the cool-} ing vapors from the contact and/or immersion vessel as a means of precooling and/or postcooling the bodies.

BRIEF DESCRIPTION OF THE DRAWINGS

These and other features of the invention will be better understood by referring to the accompanying drawings which illustrate suitable apparatus for carrying out the invention.

In the drawings.

FIGURE 3 is a part cross-sectional view of a contact and immersion vessel which is adapted to make use of the cooling vapors in precooling and postcooling the bodies in a continuous process;

FIGURE 4 is a part cross-sectional view of a contact and immersion vessel which is adapted to cool the bodies in two stages, one of which serves to insulate the other; and FIGURE 5 is a part perspective view of the apparatus for transferring the bodies from one stage to the other in FIGURE 4.

DESCRIPTION OF THE PREFERRED EMBODIMENTS

Figure 1:
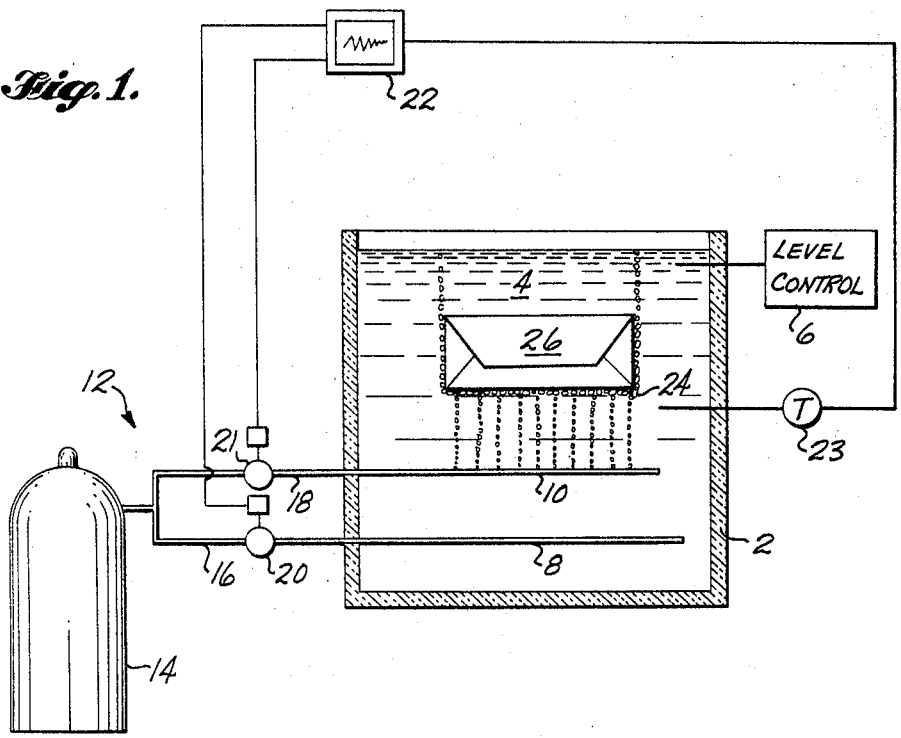
FIGURE 1 is a schematic illustration of a contact and immersion system which employs a secondary refrigerant that is liquid at room temperature.

Referring first to FIGURE 1, it will be seen that the system includes an insulated open-topped container or vessel 2 which is adapted to hold a secondary refrigerant 4 of the nature described. The vessel is filled with the refrigerant to a level determined by the process needs. This level is automatically maintained by a liquid level control 6 which measures the level of liquid in the vessel and replenishes it with additional liquid as needed. The additional liquid is obtained from a storage tank which is omitted from the illustration.

The liquid nitrogen primary refrigerant is fed to the vessel 2 through either of two diffusers, 8 and 10, one of which 8 is designed to operate at a relatively high flow rate and the other of which 10 is designed to operate at a relatively low flow rate. The high flow rate diffusion pattern is such that the secondary refrigerant 4 is agitated in a manner which will obtain a uniform temperature throughout the vessel. The flow rate itself is a function of the cool down requirements in the vessel. The diffusion pattern of the low flow rate diffuser 10, on the other hand, is such as to provide maximum agitation around and through the product being cooled. The flow rate through this diffuser is determined by the characteristics of the secondary refrigerant and the heat absorbed by the process load and the ambient surroundings.

The apparatus for supplying the liquid nitrogen to the diffusers is indicated generally at 12. It includes a pressurized liquid nitrogen container 14 and a pair of feed lines 16 and 18 from the container to the diffusers. Each feed line is regulated by an electric solenoid or electropneumatic valve 20 or 21 which is under the control of a temperature controller 22 which measures the temperature of the secondary refrigerant 4 at 23 and opens and closes the valves 20 and 21 in accord with what is needed to attain the desired temperature. This temperature is a function of the process load, the rate of heat leak to the environment, and the characteristics of the secondary refrigerant 4.

In operating the system after the vessel 2 has been charged with the refrigerant, the temperature controller 22 first supplies liquid nitrogen 24 to the vessel through the high flow rate diffuser. The supply is continued until the refrigerant obtains the desired temperature. When the set point is reached, the controller 22 then closes the high flow rate diffuser valve 20 and opens the low flow rate diffuser valve 21. The system is ready thereafter for the bodies, in this case perishable food bodies 26 which are immersed in the secondary refrigerant while the liquid nitrogen flow is continued through the low flow rate diffuser 10. If the temperature of the refrigerant deviates sharply from the set point, the valve 20 may be opened again to stabilize it.

Figure 2:
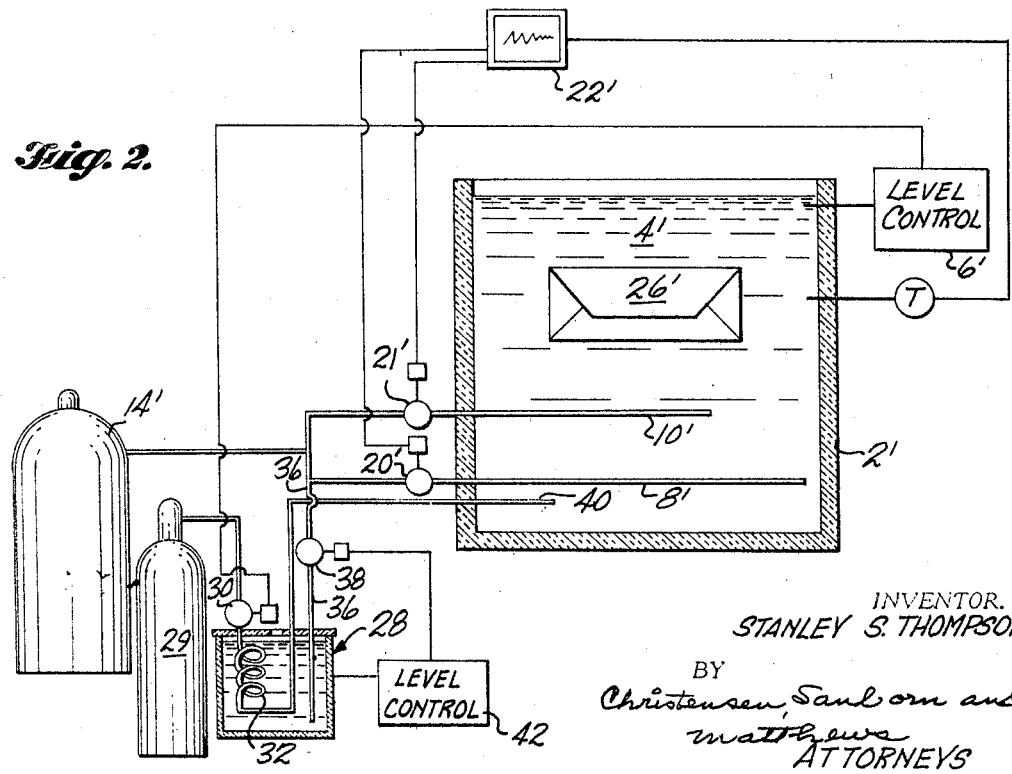
FIGURE 2 is a similar illustration of a system which employs a secondary refrigerant that has a boiling point below room temperature.

The embodiment of FIGURE 2 is modified to include a liquefier 28 for the secondary refrigerant. The liquefier may be needed where the refrigerant has a low boiling point, as in the case of Freon 13 ($CCLF_3$). In such a case, the high pressure Freon gas 29 is admitted to the liquefier through a shutoff valve 30 which is under the control of the level control 6' for the vessel 2'. In the liquefier, the gas passes through cooling coils 32 that are immersed in liquid nitrogen condensate from a liquid nitrogen container 14' connected to the liquefier by a feed line 36 under the control of a shutoff valve 38. The shutoff valve 38 is controlled in turn by a level control 42 for the liquefier. The outlet end 40 of the coils 32 discharges into the refrigerant vessel 2' at a point below the two diffusers 8' and 10'.

The vessel 2' is filled with the Freon condensate 4' from the coils 32, and at the same time liquid nitrogen is introduced through the high flow rate diffuser 8' to chill the condensate in the manner of FIGURE 1. As soon as the desired level is reached in the vessel, the level control 6' closes the valve 30 and the temperature controller 22' thereafter feeds the liquid nitrogen into the vessel through the low rate diffuser 10' for the purposes of freezing the perishables 26'.

FIGURE 3 illustrates a system in which the vessel is adapted to a continuous process and to a precooling and postcooling procedure. The vessel takes the form of a trough 46 with sloping side walls which are traversed by a conveyor mechanism 48 that crosses the trough at a level sufficiently above the bottom of the trough to accommodate the necessary diffusion apparatus as represented by numeral 50. In moving in and out of the trough, the conveyor mechanism is guided along the length of a tunnel 52 which extends in transverse relationship to the trough 46 and opens onto the top of it. A pair of fans 54 are suspended in the tunnel above the trough to siphon off the cooling vapors from the liquid and to direct them along the two legs of the tunnel. The passage of the conveyor 48 through these cooling vapors effectively precools and postcools the perishables 26" which are carried on the conveyor.

In FIGURE 4, the vessel 56 is adapted to subject the perishables 26" to two cooling stages. The vessel is divided by an annular baffle 58 into concentric inner and outer compartments 60 and 62, respectively. Each compartment is serviced by diffusion apparatus indicated generally by numerals 64 and 65. By controlling the choice and depth of the refrigerant, and the liquid nitrogen flow rate, the refrigerant in the inner compartment is maintained at a lower temperature than that in the outer compartment.

The perishables are suspended from a rotatable immersion device which can be raised and lowered while rotating, to dip the perishables 26" in and out of the two compartments. The device is essentially a post 66 having concentric inner and outer columnar sections 68 and 70, respectively, which can be raised and lowered in unison, and also rotated at either the same rate or at differing rates. The post is journalled and sealed in the bottom of the vessel and driven by combined rotational and translatory means schematically represented at 72 under the vessel. The inner section 68 of the post has a laterally extending arm 73 which is divided into fore and aft portions 74 and 76, respectively, that are pivotally interconnected at 78. The arm projects through a slot 80 in the upper circumferential wall of the outer section of the post and is pivotally interconnected with a flange plate 82 on the top of the outer section, by means of a link 84 extending between the plate and the fore portion of the arm.

The perishables are suspended from the arm in a sling 86 which can be quickly slipped on and off of the end of the arm. In use, both sections of the post are rotated in unison to slowly circle the perishables through the outer compartment 62 which has the higher operating temperature. Thereafter, at a predetermined point in time, the angular speed of one section is changed and the post is elevated to raise and shift the sling into a position over the inner compartment 60 which has the lower temperature. The post is then quickly lowered to plunge the perishables into the inner compartment for the final freezing step. As soon as the freezing operation is complete, the post is raised again and using a suitable grappling device (not shown) and/or the arm 73, the perishables are removed from the sling.

Other additions and modifications will occur to those skilled in the art without departing from the scope and spirit of the invention as defined in the following claims.

What is claimed is:

1. A method of quick freezing a liquid-immersible food body or the like to a given temperature, comprising injecting a liquified gas at an expansion pressure directly into a bath of secondary refrigerant which is liquid at the foregoing temperature, at a point below the surface of the bath, while the entire body is immersed in the bath of secondary refrigerant at a level between the point of injection and the surface of the bath, and adjacent to the point of injection so that the agitation produced by the gas discharge tends to break down any film of secondary refrigerant insulating the surfaces of the body.

2. The method according to claim 1 wherein the liquefied gas is contacted with the secondary refrigerant before the body is immersed therein, so as to lower the temperature of the secondary refrigerant to at least the foregoing given temperature, and then the secondary refrigerant is maintained at the reduced temperature while the body is immersed therein, by injecting the liquified gas into the bath.

3. The method according to claim 1 wherein the liquified gas is nitrogen.

4. The method according to claim 3 wherein the liquid nitrogen is injected into the bath at atmospheric pressure.

5. A method of quick freezing liquid-immersible bodies to a given temperature, comprising contacting liquid nitrogen at an expansion pressure, with a secondary refrigerant which is liquid at the foregoing temperature, so as to lower the temperature of the secondary refrigerant to at least such temperature, and immersing the bodies in the secondary refrigerant while it is at the reduced temperature, to quick freeze the bodies to the same, the secondary refrigerant being divided into two parts which are maintained at different operating temperatures, and the bodies being immersed in one part and then the other.

6. The method according to claim 2 wherein the liquified gas is injected into the bath at a relatively high flow rate to lower the temperature of the secondary refrigerant to the sub-cold state before the body is immersed therein, and then is injected into the bath at a relatively low flow rate to maintain the refrigerant in a sub-cold state while the body is immersed therein.

7. The method according to claim 1 wherein the body is precooled and/or postcooled in the cooling vapors from the bath.

8. The method according to claim 5 wherein a common secondary refrigerant is used in each part.

9. The method according to claim 5 wherein the bodies are subjected to movement in one part of the secondary refrigerant, during the period of retention therein.

References Cited

UNITED STATES PATENTS

| | | | |
|---|---|---|---|
| 2,428,412 | 10/1947 | Dodkin | 62—373 X |
| 3,297,454 | 1/1967 | Webster et al. | 99—193 |
| 2,759,336 | 8/1956 | Seefeldt | 62—373 X |
| 2,951,351 | 9/1960 | Snelling | 62—64 X |
| 3,078,687 | 2/1963 | Woolrich | 62—64 |
| 3,247,678 | 4/1966 | Mohlman | 62—373 X |
| 3,298,188 | 1/1967 | Webster et al. | 62—64 X |

OTHER REFERENCES

Cryogenic freezing, S. D. Holdsworth in food manufacture, July 1967, pp. 42–47.

ROBERT A. O'LEARY, *Primary Examiner.*

WILLIAM E. WAYNER, *Assistant Examiner.*

U.S. Cl. X.R.

62—64, 373; 165—1